(12) United States Patent
Tonguz et al.

(10) Patent No.: US 10,178,176 B2
(45) Date of Patent: Jan. 8, 2019

(54) METHODS AND SYSTEMS FOR MANAGING NETWORK COMMUNICATIONS TO AND FROM A VEHICLE NETWORK

(71) Applicants: GM GLOBAL TECHNOLOGY OPERATIONS LLC, Detroit, MI (US); CARNEGIE MELLON UNIVERSITY, Pittsburgh, PA (US)

(72) Inventors: Ozan Tonguz, Pittsburgh, PA (US); Hsu-Chieh Hu, Northridge, CA (US); Fan Bai, Ann Arbor, MI (US)

(73) Assignees: CARNEGIE MELLON UNIVERSITY, Pittsburgh, PA (US); GM GLOBAL TECHNOLOGY OPERATIONS LLC, Detroit, MI (US)

( * ) Notice: Subject to any disclaimer, the term of this patent is extended or adjusted under 35 U.S.C. 154(b) by 375 days.

(21) Appl. No.: 14/796,566

(22) Filed: Jul. 10, 2015

(65) Prior Publication Data
US 2017/0012883 A1  Jan. 12, 2017

(51) Int. Cl.
*H04L 29/08* (2006.01)
*H04W 4/04* (2009.01)
*H04W 80/06* (2009.01)

(52) U.S. Cl.
CPC ............. *H04L 67/12* (2013.01); *H04W 4/046* (2013.01); *H04W 80/06* (2013.01)

(58) Field of Classification Search
CPC ....................................................... H04L 67/12
See application file for complete search history.

(56) References Cited

U.S. PATENT DOCUMENTS

| 8,705,527 B1* | 4/2014 | Addepalli | H04W 4/046 370/389 |
| 9,047,778 B1* | 6/2015 | Cazanas | G08G 1/166 |
| 2004/0236499 A1* | 11/2004 | Watanabe | G01C 21/26 701/400 |
| 2014/0241163 A1* | 8/2014 | Lee | H04W 48/16 370/235 |
| 2015/0281288 A1* | 10/2015 | Levinson | H04L 47/41 709/219 |

* cited by examiner

*Primary Examiner* — Sulaiman Nooristany
(74) *Attorney, Agent, or Firm* — Lorenz & Kopf, LLP

(57) ABSTRACT

Methods and systems for communicating data between a network and devices of a vehicle are provided. A method includes: determining, by a processor, a value associated with a round trip time based on vehicle information; adjusting, by the processor, a size of a window used in communication with the network based on the value; and communicating data at least one of to and from the network based on the size of the window.

14 Claims, 5 Drawing Sheets

METHODS AND SYSTEMS FOR MANAGING NETWORK COMMUNICATIONS TO AND FROM A VEHICLE NETWORK

TECHNICAL FIELD

The technical field generally relates to network communications, and more particularly to methods and systems for managing network communications to and from a vehicle network.

BACKGROUND

The use of personal electronic devices is becoming increasingly popular. Many applications on the personal electronic devices require internet access. In some cases, it is desirable to use the personal electronic device to access the internet while driving in a vehicle. For example, a passenger may wish to access the internet while driving on a long road trip.

Internet access can be provided to the personal electronic devices or other applications of the vehicle through a modem or other connectivity device that communicates with a broadband network through the vehicle's antenna. The performance of some broadband networks (such as Long Term Evolution (LTE) or other networks) however, is vulnerable to varying bandwidth and long latency. For example, conventional Transmission Control Protocols (TCPs) of the networks are not able to fully utilize the existing bandwidth. Communicating data under the conventional TCPs while traveling in a vehicle typically exacerbates such issues.

Accordingly, it is desirable to provide improved methods and systems for communicating data. It is further desirable to provide methods and systems for communicating data to and from a vehicle while the vehicle is traveling. Furthermore, other desirable features and characteristics of the present invention will become apparent from the subsequent detailed description and the appended claims, taken in conjunction with the accompanying drawings and the foregoing technical field and background.

SUMMARY

Methods and systems for communicating data between a network and devices of a vehicle are provided. In one embodiment, a method includes: determining, by a processor, a value associated with a round trip time based on vehicle information; adjusting, by the processor, a size of a window used in communication with the network based on the value; and communicating data at least one of to and from the network based on the size of the window.

In one embodiment, a system includes: a first module that determines, by a processor, a value associated with a round trip time based on vehicle information. A second module adjusts, by a processor, a size of a window used in communication with the network based on the value. A third module communicates data at least one of to and from the network based on the size of the window.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
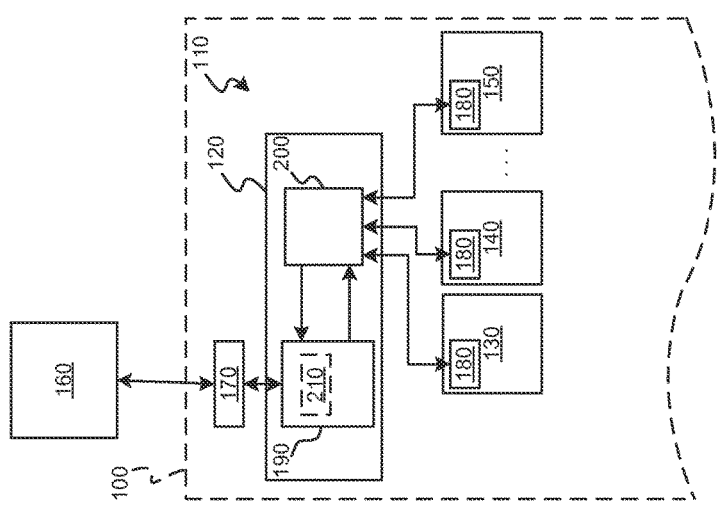
FIG. 1 is a functional block diagram of an exemplary vehicle including a communication system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

With reference to FIG. 1, an exemplary vehicle 100 is shown in part that includes a communication system 110 in accordance with exemplary embodiments. As can be appreciated, the vehicle 100 may be any vehicle type including but not limited to, an automobile, a sport utility vehicle, a watercraft, an aircraft, etc. Although the figures shown herein depict an example with certain arrangements of elements, additional intervening elements, devices, features, or components may be present in actual embodiments. It should also be understood that FIG. 1 is merely illustrative and may not be drawn to scale.

As shown, the communication system 110 includes a communication module 120. The communication module 120 receives data from one or more devices 130-150 within the vehicle 100 and communicates the data to one or more devices 160 remote from the vehicle 100 (hereinafter referred to as the remote device 160). The communication module 120 communicates to the remote device 160 from the vehicle 100, for example, via an antenna 170 or other transceiver of the vehicle 100.

Similarly, the communication module 120 receives data from the one or more devices 160 remote from the vehicle 100 and communicates the data to the one or more devices 130-150 within the vehicle 100 (hereinafter referred to as in-vehicle devices 130-150). The communication module 120 communicates to the in-vehicle devices 130-150, for example, via transceivers 180 of the in-vehicle devices 130-150.

In various embodiments, the remote device 160 can be, for example, a network device such as base station (BS) or other device or system of a network established by a wireless service provider. The network can be, for example, a broadband wireless network such as, but not limited to, Long Term Evolution (LTE), or Long Term Evolution-Advanced (LTE-A), or other networks. The in-vehicle devices 130-150 can be, for example, personal electronic devices (e.g., cell phones, tablets, wearable devices, etc.) or vehicle devices that communicate according to a wireless communication protocol such as, but not limited to, Wi-Fi, Bluetooth, WiGig, Zigbee, or other protocols.

In various embodiments, the communication module 120 includes a remote device communication module 190 and an in-vehicle device communication module 200. The remote device communication module 190 communicates the data to and from the remote device 160 according to the broadband communication protocol. The in-vehicle device communication module 200 communicates data to and from the in-vehicle devices 130-150 according to the wireless communication protocol. The remote device communication module 190 communicates the received data to the in-vehicle communication module 200 according to a wired or wireless communication protocol. Likewise, the in-vehicle communication module 200 communicates the received data to the remote device communication module 190 according to a wired or wireless communication protocol.

In order to address latency and throughput issues with communicating data to and from the remote devices 160, the remote device communication module 190 includes one or more adaptive communication modules 210 that adapt the communication methods used to send and receive the data based on, for example, vehicle specific information. As will be discussed in more detail below, the vehicle specific information can include, for example, but is not limited to, current vehicle kinematic information (e.g., vehicle speed) and/or the wireless channel conditions under which the vehicle is driving.

Figure 2:
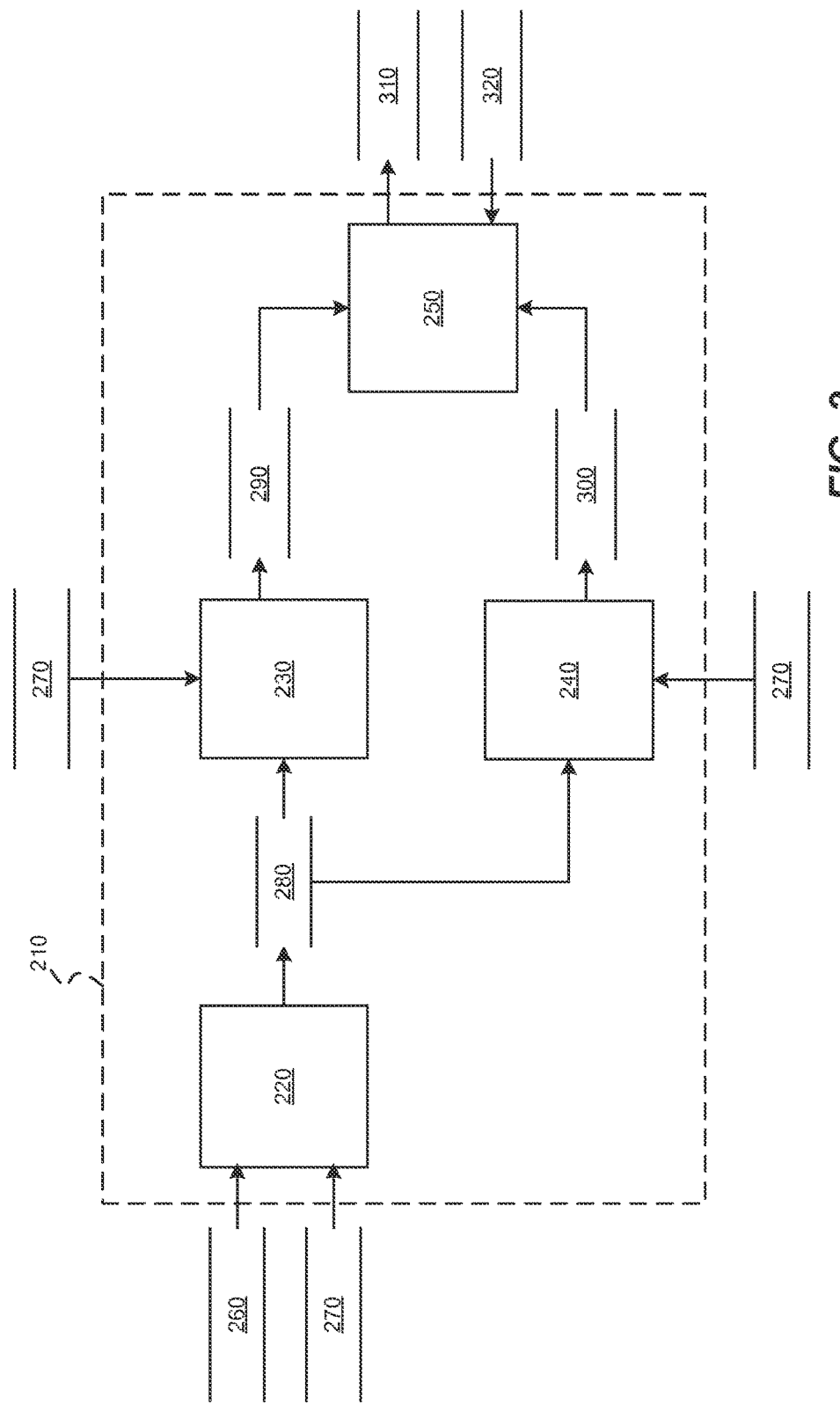
FIG. 2 is a dataflow diagram illustrating a communication module of the communication system of FIG. 1 in accordance with various embodiments.

Referring now to FIG. 2 and with continued reference to FIG. 1, a dataflow diagram illustrates an adaptive communication module 210 of the remote device communication module 190 in more detail in accordance with various exemplary embodiments. As can be appreciated, various exemplary embodiments of the adaptive communication module 210, according to the present disclosure, may include any number of sub-modules. In various exemplary embodiments, the sub-modules shown in FIG. 2 may be combined and/or further partitioned to similarly adapt the communication methods based on the vehicle specific information such as the vehicle speed or wireless channel conditions under which the vehicle is driving. In various exemplary embodiments, the adaptive communication module 210 includes a round trip time (RTT) determination module 220, a first window adapt module 230, a second window adapt module 240, and one or more Transmission Control Protocol (TCP) communication modules 250 that the window adapt module 230 and 240 control and supervise.

In various embodiments, the window adapt modules 230, 240 adjust a size 290 of a receive window and a size 300 of a congestion window based on a value 280 associated with a round trip time (RTT). For example, the RTT can be the time taken to send a message from one end of a network to the other and back. The sizes 290, 300 of the receive window and the congestion window are provided to the TCP communication module 250 for use in communicating data packets 310, 320. The RTT determination module 220 determines the value 280 associated with the RTT and provides the value to the window adapt modules 230, 240.

For example, the RTT determination module 220 determines a value 280 as a ratio that is based on a minimum RTT within a timeframe and a current RTT. For example, the RTT determination module 220 determines a timeframe (TF) based on vehicle information 270 such as vehicle speed and/or vehicle channel information. The RTT determination module then records (X) samples 260 of RTT within the timeframe and stores the samples in a list (L). The RTT determination module 220 then evaluates the samples from the list (L) that fall within the timeframe (TF) to determine the minimum RTT. The RTT determination module 220 determines the ratio 280 by dividing the minimum RTT by the current RTT.

The RTT determination module 220 determines the timeframe (TF) based on whether the vehicle speed is low (e.g., below a threshold) or high (e.g., above a threshold). For example, while the vehicle speed is low, the timeframe is set to a standard time; and while the vehicle speed is high, the timeframe is reduced to reflect the variation of bandwidth. In various embodiments, the vehicle speed information can be received from global positioning system (GPS) devices, vehicle sensors, and/or channel estimators of the communication module. It can estimate the speed by estimating the current channel and selecting different filter parameters. For example, a set of channel filter parameters is provided and corresponds to different channel conditions, e.g., channel conditions under different velocities. The velocity information can be extracted from the filter parameters by estimating channel.

In various embodiments, the first window adapt module 230 adjusts a size 290 of a receive window used in the communication methods (e.g., TCP or other methods) to receive information (data packets) from the remote device 160 (also referred to as a download (DL)). If the receive window is too large, then a delay will occur due to a bufferbloat phenomenon. Conversely, if the receive window is set too small, then throughput will be impeded. Thus, the first window adapt module 230 selectively adjusts the size 290 of the receive window such that the window is not too large and not too small.

For example, the first window adapt module 230 uses the RTT ratio 280 to evaluate the instant status of the bandwidth utilization and to adjust the receive window size 290. For example, if the RTT ratio 280 is approximately equal to one, the first window adapt module 230 determines that a queuing delay has not been accumulated yet, and that the RTT mainly consists of propagation delay and transmission delay. In this situation, the first window adapt module 230 increases the receive window size 290 for using the available bandwidth. For example, the first window adapt module 230 computes a modifier Y based on the vehicle information 270 and adjusts the receive window size 290 based on the modifier Y.

In another example, if the RTT ratio 280 is smaller than one, the first window adapt module 230 determines that the queue starts to accumulate packets. In this situation, large end-to-end delay will corrupt throughput and other performance thus, the first window adapt module 230 decreases the receive window size 290. For example, the first window adapt module 230 adjusts the receive window size 290 by the RTT ratio 280.

In various embodiments, the second window adapt module 240 adjusts the size 300 of a congestion window used in the communication methods (e.g., TCP, or other methods) to send information (data packets) to the remote device (also referred to as an upload (UL)). Similarly, if the congestion window is too large, then a delay will occur due to a bufferbloat phenomenon. Conversely, if the congestion window is set too small, then throughput will be impeded. Thus, the second window adapt module 240 selectively adjusts the size 300 of the congestion window such that the window is not too large and not too small.

For example, the second window adapt module 240 uses the RTT ratio 280 to evaluate the instant status of the bandwidth utilization and to adjust the congestion window size 300. For example, if the RTT ratio 280 is approximately equal to one, and there exists some packet loss, the second window adapt module 240 determines the second window adapt module 240 increases the congestion window size 300 for using the available bandwidth. For example, the second window adapt module 240 computes a modifier Y based on the vehicle information 270 and adjusts the congestion window size 300 based on the modifier Y.

In another example, if the RTT ratio 280 is smaller than one, the second window adapt module 240 decreases the congestion window size 300. For example, the second window adapt module 240 adjusts the congestion window size 300 by the RTT ratio 280.

Figure 3:
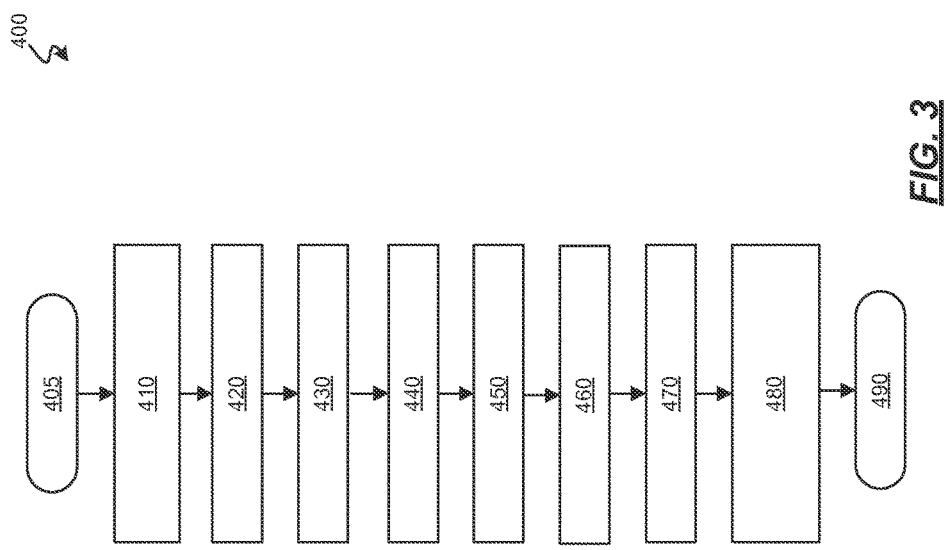
FIGS. 3, 4, and 5 are flowcharts illustrating communication methods that may be performed by the communication module in accordance with various embodiments.
Figure 4:
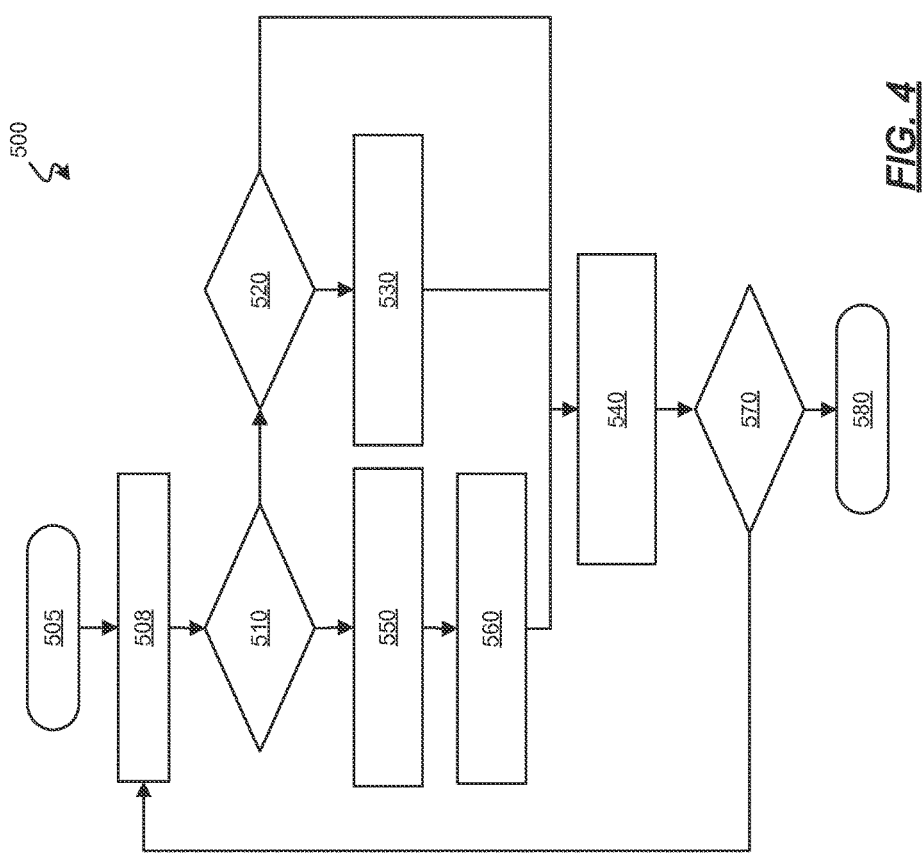
Figure 5:
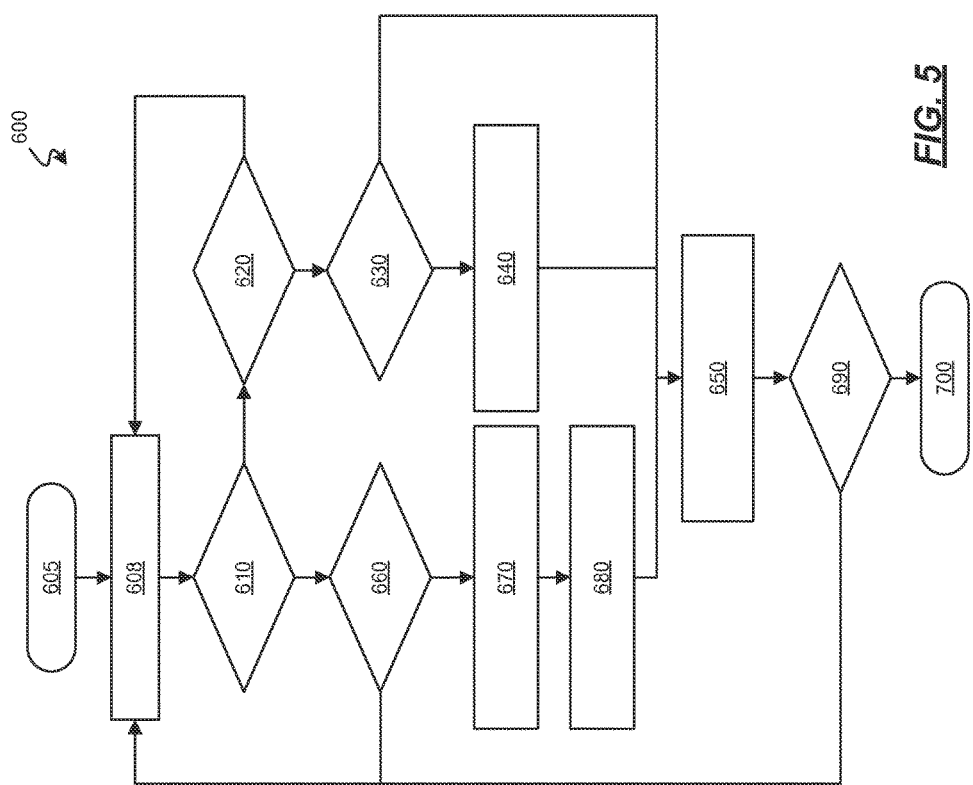

With reference now to FIGS. 3, 4, and 5, and with continued reference to FIGS. 1-2, flowcharts are shown of methods 400, 500, and 600 for communicating data in accordance with various embodiments. The methods 400, 500, and 600 can be implemented in connection with the vehicle 100 of FIG. 1 and can be performed by the communication module 120 of FIG. 1, in accordance with various exemplary embodiments. As can be appreciated in light of the disclosure, the order of operation within the method is not limited to the sequential execution as illustrated in FIGS. 3, and 5, but may be performed in one or more varying orders as applicable and in accordance with the present disclosure. As can further be appreciated, the methods of FIGS. 3, 4, and 5 may be scheduled to run at predetermined time intervals during operation of the vehicle 100 and/or may be scheduled to run based on predetermined events.

FIG. 3 is a flowchart of a method for determining the RTT ratio 280. As depicted in FIG. 3, the method 400 may begin at 405. Data is received at 410. The RTT is estimated based on the received data and any smoothing or filtering is performed on the RTT estimation at 420. The estimated RTTs and timestamps are stored in the list (L) at 430. The vehicle information 270, such as vehicle speed and/or channel information, is determined at 440. The timeframe (TF) is adjusted based on the vehicle information 270 at 450. The RTT samples in the list (L) outside of the time frame (TF) are discarded at 460. The RTT minimum is determined from the remaining RTT samples in the list (L) at 470. The RTT ratio 280 is determined by dividing the RTT minimum by the RTT current at 480. Thereafter, the method may end at 490.

FIG. 4 is a flowchart of a method 500 for determining the receive window size 290 and communicating according to the receive window size 290. The method 500 may begin at 505. The RTT ratio 280 is determined, for example, by the method 400 at 508. Thereafter, RTT ratio 280 is evaluated at 510 and 520. If the RTT ratio 280 is less than 1−x (where 1−x defines a range where RTT minimum is approximately equal to the RTT current), and the RTT is greater than D (where D represents a delay constraint of the application), then the receive window size 290 is reduced at 530. For example, the receive window size 290 is computed based on the current window size and the RTT ratio 280 (RWND=RWND*RTT ratio). Thereafter, the receive window in the TCP method is adjusted based on the receive window size 290 at 540. If the RTT ratio 280 is less than 1−x (where 1−x defines a range where RTT minimum is approximately equal to the RTT current), however, the RTT is not greater than D at 520, then the receive window size 290 remains the same at 540.

If, however, the RTT ratio 280 is not less than 1−x at 510, then the receive window size 290 is increased at 550 and 560. For example, a vehicle modifier Y is computed based on the vehicle information at 550 and larger than one, and the receive window size 290 is computed based on the current window size and the vehicle modifier Y (RWND=RWND*Y). Thereafter, the receive window in the TCP method is adjusted based on the receive window size 290 at 540. If, at 570, the buffer is not equal to zero (i.e., the communication is not complete), the method continues by determining the RTT ratio at 508. The method continues until the buffer is equal to zero at 570, in which case the method may end at 580.

FIG. 5 is a flowchart of a method 600 for determining the congestion window size 300 and communicating according to the congestion window size 300. The method 600 may begin at 605. The RTT ratio 280 is determined, for example, by the method 400 at 608. Thereafter, RTT ratio 280 is evaluated at 610. If the RTT ratio 280 is less than 1−x, where 1−x defines a range where RTT minimum is approximately equal to the RTT current, it is determined whether there is any packet loss in the communications at 620. If there is no packet loss at 620, the method continues at 608.

If, however, there is packet loss at 620, it is determined whether the RTT ratio 280 is greater than D, where D represents a delay constraint of the application, at 630. If the RTT is not greater than D at 630, then the congestion window size 300 remains the same at 650. If, however, the RTT is greater than D at 630, then the congestion window size 300 is reduced at 640. For example, the congestion window size 300 is computed based on the current window size and the RTT ratio (RWND=RWND*RTT ratio). Thereafter, the congestion window in the TCP method is adjusted based on the congestion window size 300 at 650.

If, at 610, the RTT ratio 280 is not less than 1−x, then it is determined whether there is packet loss in the communication at 660. If there is no packet loss at 660, the method continues at 608. If, however, there is packet loss at 660, the congestion window size 300 is increased at 670 and 680. For example, a vehicle modifier Y is computed based on the vehicle information at 670 and larger than one, and the congestion window size 300 is computed based on the current window size and the vehicle modifier Y (CWND=CWND*Y). Thereafter, the congestion window is adjusted based on the congestion window size 300 at 650.

If, at 690, the buffer is not equal to zero (i.e., the communication is not complete), the method continues by determining the RTT ratio 280 at 608. The method continues until the buffer is equal to zero at 690, in which case the method may end at 700.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for communicating data between a network and devices of a vehicle, comprising:
    selecting, by a processor, a first timeframe from a plurality of timeframes when vehicle speed is below a speed threshold;
    selecting, by the processor, a second timeframe from the plurality of time frames when the vehicle speed is above the speed threshold, wherein the second timeframe is smaller than the first timeframe;
    sampling, by the processor, within the selected timeframe a plurality of round trip times associated with the network,
    determining, by the processor, a minimum round trip time from the plurality of round trip times;
    determining, by the processor, a ratio by dividing the minimum round trip time by a current round trip time;
    adjusting, by the processor, a size of a window used in communication with the network based on the ratio; and
    communicating data between the network and the devices of the vehicle based on the size of the window.

2. The method of claim 1, wherein the vehicle speed is determined from wireless channel conditions under which the vehicle is driving.

3. The method of claim 1, wherein the window is a receive window used in a transport-layer protocol.

4. The method of claim 1, wherein the window is a congestion window used in a transmission control protocol.

5. The method of claim 1, wherein the adjusting the size comprises decreasing the size of the window by the ratio when the ratio is less than a determined value.

6. The method of claim 5, wherein the adjusting the size comprises increasing the size of the window by a modifier when the ratio is approximately equal to the determined value.

7. The method of claim 6, wherein the increasing the size is based on vehicle information.

8. The method of claim 7, wherein the vehicle information includes vehicle speed.

9. The method of claim 7, wherein the vehicle information includes wireless channel condition information under which the vehicle is driving.

10. The method of claim 1, further comprising determining whether there is a packet loss, and wherein the adjusting the size is based on whether there is a packet loss.

11. A system for communicating data between a network and devices of a vehicle, comprising:
    a non-transitory computer readable medium, comprising:
        a first module that selects, by a processor, a first timeframe from a plurality of timeframes when vehicle speed is below a speed threshold, that selects, by the processor, a second timeframe from the plurality of time frames when the vehicle speed is above the speed threshold, wherein the second timeframe is smaller than the first timeframe, that samples, by the processor, within the selected timeframe a plurality of round trip times associated with the network, that determines, by the processor, a minimum round trip time from the plurality of round trip times, and that determines, by the processor, a ratio by dividing the minimum round trip time by a current round trip time;
        a second module that adjusts, by the processor, a size of a window used in communication with the network based on the ratio; and
        a third module that, by the processor, communicates data between devices of the vehicle and the network based on the size of the window.

12. The system of claim 11, wherein the vehicle speed is determined from wireless channel condition under which the vehicle is driving.

13. The system of claim 11, wherein the second module decreases the size of the window based on the ratio and increases the size of the window based on the vehicle information.

14. The system of claim 11, wherein the network is a broadband network.

* * * * *